United States Patent
Maes (10) Patent No.: US 7,917,612 B2
(45) Date of Patent: Mar. 29, 2011

(54) TECHNIQUES FOR ANALYZING COMMANDS DURING STREAMING MEDIA TO CONFIRM DELIVERY

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1180 days.

(21) Appl. No.: 11/138,546

(22) Filed: May 25, 2005

(65) Prior Publication Data

US 2006/0271488 A1 Nov. 30, 2006

(51) Int. Cl.
G06F 15/173 (2006.01)
G06F 15/16 (2006.01)
H04N 7/16 (2006.01)

(52) U.S. Cl. .............................. 709/224; 709/217; 725/1
(58) Field of Classification Search .................... 709/52, 709/77, 217
See application file for complete search history.

(56) References Cited

U.S. PATENT DOCUMENTS

| | | | |
|---|---|---|---|
| 4,996,642 A | 2/1991 | Hey | |
| 6,240,401 B1 * | 5/2001 | Oren et al. | 705/40 |
| 6,308,328 B1 * | 10/2001 | Bowcutt et al. | 725/111 |
| 6,334,127 B1 | 12/2001 | Bieganski et al. | |
| 6,438,579 B1 | 8/2002 | Hosken | |
| 6,546,555 B1 * | 4/2003 | Hjelsvold et al. | 725/1 |
| 6,567,657 B1 * | 5/2003 | Holly et al. | 455/408 |
| 6,601,061 B1 | 7/2003 | Holt et al. | |
| 6,665,659 B1 | 12/2003 | Logan | |
| 6,732,366 B1 * | 5/2004 | Russo | 725/5 |
| 6,769,127 B1 * | 7/2004 | Bonomi et al. | 725/39 |
| 6,847,969 B1 | 1/2005 | Mathai et al. | |
| 6,854,010 B1 * | 2/2005 | Christian et al. | 709/223 |
| 6,892,228 B1 | 5/2005 | Penders | |
| 7,149,797 B1 * | 12/2006 | Weller et al. | 709/223 |
| 7,181,523 B2 * | 2/2007 | Sim | 709/238 |
| 7,197,570 B2 * | 3/2007 | Eylon et al. | 709/231 |
| 7,233,790 B2 | 6/2007 | Kjellberg et al. | |
| 7,272,651 B1 * | 9/2007 | Bolding et al. | 709/227 |
| 7,360,210 B1 | 4/2008 | Vacanti et al. | |
| 7,363,384 B2 | 4/2008 | Chatani et al. | |
| 7,366,495 B1 * | 4/2008 | Magnotta et al. | 455/406 |
| 7,386,623 B2 * | 6/2008 | Nishimura et al. | 709/231 |

(Continued)

OTHER PUBLICATIONS

Schulzrinne et al., Real Time Streaming Protocol (RTSP) RFC 2326, Apr. 1998.*
RealNetworks, Inc. Using RTSP with Firewalls Proxies, and Other Intermediary Network Devices, Version 2.0/rev.2, 1998 http://docs.real.com/docs/proxykit/rtspd.pdf.*

(Continued)

*Primary Examiner* — Shawki S Ismail
*Assistant Examiner* — Robert Shaw
(74) *Attorney, Agent, or Firm* — Kilpatrick Townsend & Stockton LLP (57) ABSTRACT

Techniques for determining a status of a streaming delivery of content are provided. During the streaming delivery of content between a device and a content provider, commands may be sent between the device and a content provider in order to facilitate the delivery of content. These commands may be intercepted by a command interpreter. The commands are then analyzed to determine a delivery status for the streaming delivery of content. For example, the sequence of commands may provide an indication as to whether the streaming delivery of content was successful or not. Based on the commands, the command interpreter determines if the streaming delivery of content should be considered successful from a billing standpoint. For example, a user that requested the streaming delivery of content may be billed based on whether the streaming delivery of content is considered successful or not.

28 Claims, 5 Drawing Sheets

U.S. PATENT DOCUMENTS

| | | | |
|---|---|---|---|
| 7,783,635 | B2 | 8/2010 | Maes |
| 2001/0027558 | A1* | 10/2001 | Sasselli et al. ............... 725/1 |
| 2002/0022453 | A1 | 2/2002 | Balog et al. |
| 2002/0056126 | A1* | 5/2002 | Srikantan et al. ............ 725/87 |
| 2002/0083124 | A1* | 6/2002 | Knox et al. ............... 709/203 |
| 2002/0116291 | A1 | 8/2002 | Grasso et al. |
| 2002/0124182 | A1* | 9/2002 | Bacso et al. ............... 713/200 |
| 2002/0128984 | A1* | 9/2002 | Mehta et al. ............... 705/71 |
| 2002/0143565 | A1 | 10/2002 | Headings et al. |
| 2002/0152224 | A1 | 10/2002 | Roth et al. |
| 2002/0152305 | A1* | 10/2002 | Jackson et al. ............ 709/224 |
| 2002/0184195 | A1 | 12/2002 | Qian |
| 2002/0194251 | A1* | 12/2002 | Richter et al. ............. 709/105 |
| 2003/0028890 | A1* | 2/2003 | Swart et al. ............... 725/91 |
| 2003/0061611 | A1 | 3/2003 | Pendakur |
| 2003/0093799 | A1* | 5/2003 | Kauffman et al. ............ 725/86 |
| 2003/0154487 | A1* | 8/2003 | Tsumura ..................... 725/93 |
| 2003/0187794 | A1* | 10/2003 | Irwin et al. ............... 705/40 |
| 2003/0233241 | A1 | 12/2003 | Marsh |
| 2003/0236745 | A1* | 12/2003 | Hartsell et al. ............. 705/40 |
| 2003/0236905 | A1* | 12/2003 | Choi et al. ............... 709/231 |
| 2004/0008688 | A1* | 1/2004 | Matsubara et al. ....... 370/395.21 |
| 2004/0025186 | A1* | 2/2004 | Jennings et al. ............ 725/93 |
| 2004/0028055 | A1* | 2/2004 | Madour et al. .......... 370/395.21 |
| 2004/0044677 | A1 | 3/2004 | Huper-Graff et al. |
| 2004/0064579 | A1* | 4/2004 | Jennings ................... 709/238 |
| 2004/0102412 | A1* | 5/2004 | Reith et al. ............... 455/410 |
| 2004/0117500 | A1* | 6/2004 | Lindholm et al. .......... 709/231 |
| 2004/0117836 | A1* | 6/2004 | Karaoguz et al. ............ 725/81 |
| 2004/0133923 | A1* | 7/2004 | Watson et al. ............. 725/134 |
| 2004/0167791 | A1 | 8/2004 | Rodrigo et al. |
| 2004/0192253 | A1* | 9/2004 | Usumi ..................... 455/406 |
| 2004/0205043 | A1* | 10/2004 | Alessi et al. ............... 707/2 |
| 2004/0267812 | A1 | 12/2004 | Harris et al. |
| 2005/0009500 | A1* | 1/2005 | Ear ......................... 455/408 |
| 2005/0009541 | A1 | 1/2005 | Ye et al. |
| 2005/0021765 | A1 | 1/2005 | Flores et al. |
| 2005/0064875 | A1* | 3/2005 | Gonsalves et al. .......... 455/454 |
| 2005/0076365 | A1 | 4/2005 | Popov et al. |
| 2005/0154764 | A1 | 7/2005 | Riegler et al. |
| 2005/0198332 | A1 | 9/2005 | Laertz et al. |
| 2005/0246282 | A1* | 11/2005 | Naslund et al. ............ 705/52 |
| 2005/0283791 | A1* | 12/2005 | McCarthy et al. ............ 725/1 |
| 2006/0090187 | A1* | 4/2006 | Chae et al. ............... 725/100 |
| 2006/0100987 | A1 | 5/2006 | Leurs |
| 2006/0141984 | A1* | 6/2006 | Taglienti et al. ............ 455/406 |
| 2006/0153160 | A1* | 7/2006 | Kalland et al. ............ 370/351 |
| 2006/0168288 | A1* | 7/2006 | Covell et al. ............... 709/231 |
| 2006/0206617 | A1* | 9/2006 | Rey et al. ................. 709/231 |
| 2006/0230124 | A1 | 10/2006 | Belfiore et al. |
| 2006/0271548 | A1 | 11/2006 | Maes |
| 2006/0272028 | A1 | 11/2006 | Maes |
| 2007/0297340 | A1 | 12/2007 | Maes |
| 2008/0215704 | A1* | 9/2008 | Curcio et al. ............ 709/217 |

OTHER PUBLICATIONS

Karjoth, G., "Access Control with IBM Tivoli Access Manager," *ACM Transactions on Information and Systems Security*, May 2003, vol. 6, No. 2, pp. 232-257.

Kuo, Y.-F. et al., "Personalization technology application to Internet content provider," *Expert Systems with Applications*, 2001, vol. 21, pp. 203-215.

Boll, Susanne, "Modular Content Personalization Service Architecture for E-Commerce Applications", Proceedings of the 4th IEEE International Workshop on Advanced Issues of E-Commerce and Web-Based Information Systems, 2002, 8 pages.

U.S. Appl. No. 11/137,969, filed May 25, 2005, Advisory Action dated Mar. 4, 2010, 3 pages.

U.S. Appl. No. 11/137,969, filed May 25, 2005, Advisory Action dated Apr. 16, 2009, 4 pages.

U.S. Appl. No. 11/137,969, filed May 25, 2005, Final Office Action dated Dec. 24, 2009, 23 pages.

U.S. Appl. No. 11/137,969, filed May 25, 2005, Final Office Action dated Feb. 11, 2009, 21 pages.

U.S. Appl. No. 11/137,969, filed May 25, 2005, Final Office Action dated Mar. 5, 2008, 17 pages.

U.S. Appl. No. 11/137,969, filed May 25, 2005, Notice of Allowance dated Apr. 15, 2010, 16 pages.

U.S. Appl. No. 11/137,969, filed May 25, 2005, Office Action dated Jul. 14, 2009, 27 pages.

U.S. Appl. No. 11/137,969, filed May 25, 2005, Office Action dated Aug. 29, 2007, 13 pages.

U.S. Appl. No. 11/137,969, filed May 25, 2005, Office Action dated Aug. 5, 2008, 20 pages.

U.S. Appl. No. 11/138,844, filed May 25, 2005, Final Office Action dated Mar. 22, 2010, 14 pages.

U.S. Appl. No. 11/138,844, filed May 25, 2005, Final Office Action dated May 15, 2009, 14 pages.

U.S. Appl. No. 11/138,844, filed May 25, 2005, Office Action dated Nov. 14, 2008, 17 pages.

U.S. Appl. No. 11/138,844, filed May 25, 2005, Office Action dated Sep. 15, 2009, 17 pages.

Van Setten, Mark et al., "Context-Aware Recommendations in the Mobile Tourist Application COMPASS", AH 2004, LNCS3137, pp. 235-244, 2004.

U.S. Appl. No. 11/138,844, filed May 25, 2005, Advisory Action dated Jun. 1, 2010, 3 pages.

U.S. Appl. No. 11/138,844, filed May 25, 2005, Office Action dated Sep. 13, 2010, 13 pages.

U.S. Appl. No. 11/475,280, filed Jun. 26, 2006, Advisory Action dated Feb. 17, 2010, 2 pages.

U.S. Appl. No. 11/475,280, filed Jun. 26, 2006, Final Office Action dated Nov. 25, 2009, 17 pages.

U.S. Appl. No. 11/475,280, filed Jun. 26, 2006, Office Action dated May 25, 2010, 16 pages.

U.S. Appl. No. 11/475,280, filed Jun. 26, 2006, Office Action dated May 8, 2009, 15 pages.

* cited by examiner

TECHNIQUES FOR ANALYZING COMMANDS DURING STREAMING MEDIA TO CONFIRM DELIVERY

CROSS-REFERENCES TO RELATED APPLICATIONS

The present application incorporates by reference for all purposes the entire contents of the following:

U.S. application Ser. No. 11/138,844, entitled "PLATFORM AND SERVICE FOR MANAGEMENT AND MULTI-CHANNEL DELIVERY OF MULTI-TYPES OF CONTENTS", filed May 25, 2005; and U.S. application Ser. No. 11/137,969, entitled "PERSONALIZATION AND RECOMMENDATIONS OF AGGREGATED DATA NOT OWNED BY THE AGGREGATOR", filed May 25, 2005.

BACKGROUND OF THE INVENTION

The present invention generally relates to content delivery and more particularly to determining a delivery status based on commands sent during content delivery.

With the advent of the Internet, the content available for a user to view has proliferated. As access speed for downloading data from the Internet has increased, the types of content that can be downloaded have also increased. For example, users can now download videos from the Internet. These videos may be short videos, short clips of videos, or large movies. Typically, when these videos are sent to a requesting client, they are streamed from a server.

Services have been created where users can order content for streaming delivery. For example, movies may be ordered on demand from content providers. Also, news clips, sports clips, etc. may also be ordered. The user typically pays for these content downloads in a prepaid or postpaid fashion. In either case, the user is either charged when the content delivery is initiated or charged when it is finally delivered.

The streaming content of delivery is not always successful. For example, there may be problems with setting up a connection between the server and the client for the streaming delivery. Also, problems with delivering the content may occur during delivery. These problems may occur because of network problems independent from the user or content delivery service or because of problems at the client or server. In either case, the service that is providing the content assumes that the user has received the streaming content of delivery successfully. Thus, the user is billed for the download of the streaming content. This method provides many disadvantages. For example, a user must now take affirmative steps in order to have the charges reversed. This may be inconvenient for a user and also cause the user to not use the content delivery service again.

BRIEF SUMMARY OF THE INVENTION

Embodiments of the present invention generally relate to techniques for determining if content delivery was successful for streaming content delivery.

In one embodiment, techniques for determining a status of a streaming delivery of content are provided. During the streaming delivery of content between a device and a content provider, commands may be sent between the device and a content provider in order to facilitate the delivery of content. These commands may be intercepted by a command interpreter. The commands are then analyzed to determine a delivery status for the streaming delivery of content. For example, the sequence of commands may provide an indication as to whether the streaming delivery of content was successful or not. Based on the commands, the command interpreter determines if the streaming delivery of content should be considered successful from a billing standpoint. For example, a user that requested the streaming delivery of content may be billed based on whether the streaming delivery of content is considered successful or not.

In one embodiment, a method for determining a status of a streaming delivery of content is provided. The method comprises: determining instructions sent between a client initiating the streaming delivery of content to a content provider providing the streaming delivery of content; analyzing the instructions to determine a delivery status; and determining if the streaming delivery should be considered successful from a billing standpoint based on the delivery status.

In another embodiment, a method for determining a status of a streaming delivery of content is provided. The method comprises: intercepting set up instructions sent between a client initiating the streaming delivery of content and a source for the set up of providing the streaming delivery of content; determining play or pause commands sent between the client and the source during the providing of the content; intercepting tear down instructions sent between the client and the source at the end of the providing of the content; analyzing the set up, play or pause, and tear down instructions to determine a delivery status; and determining if the streaming delivery should be considered successful from a billing standpoint based on the delivery status.

In yet another embodiment, a platform configured to determine a status of a streaming delivery of content is provided. The platform comprises: logic configured to intercept set up instructions sent between a client initiating the streaming delivery of content and a source for the set up of providing the streaming delivery of content; logic configured to determine play or pause commands sent between the client and the source during the providing of the content; logic configured to intercept tear down instructions sent between the client and the source at the end of the providing of the content; logic configured to analyze the set up, play or pause, and tear down instructions to determine a delivery status; and logic configured to determine if the streaming delivery should be considered successful from a billing standpoint based on the delivery status.

In another embodiment, a platform configured to determine a status of a streaming delivery of content is provided. The platform comprises: logic configured to determine instructions sent between a client initiating the streaming delivery of content to a content provider providing the streaming delivery of content; logic configured to analyze the instructions to determine a delivery status; and logic configured to determine if the streaming delivery should be considered successful from a billing standpoint based on the delivery status.

A further understanding of the nature and the advantages of the inventions disclosed herein may be realized by reference of the remaining portions of the specification and the attached drawings.

DETAILED DESCRIPTION OF THE INVENTION

Figure 1:
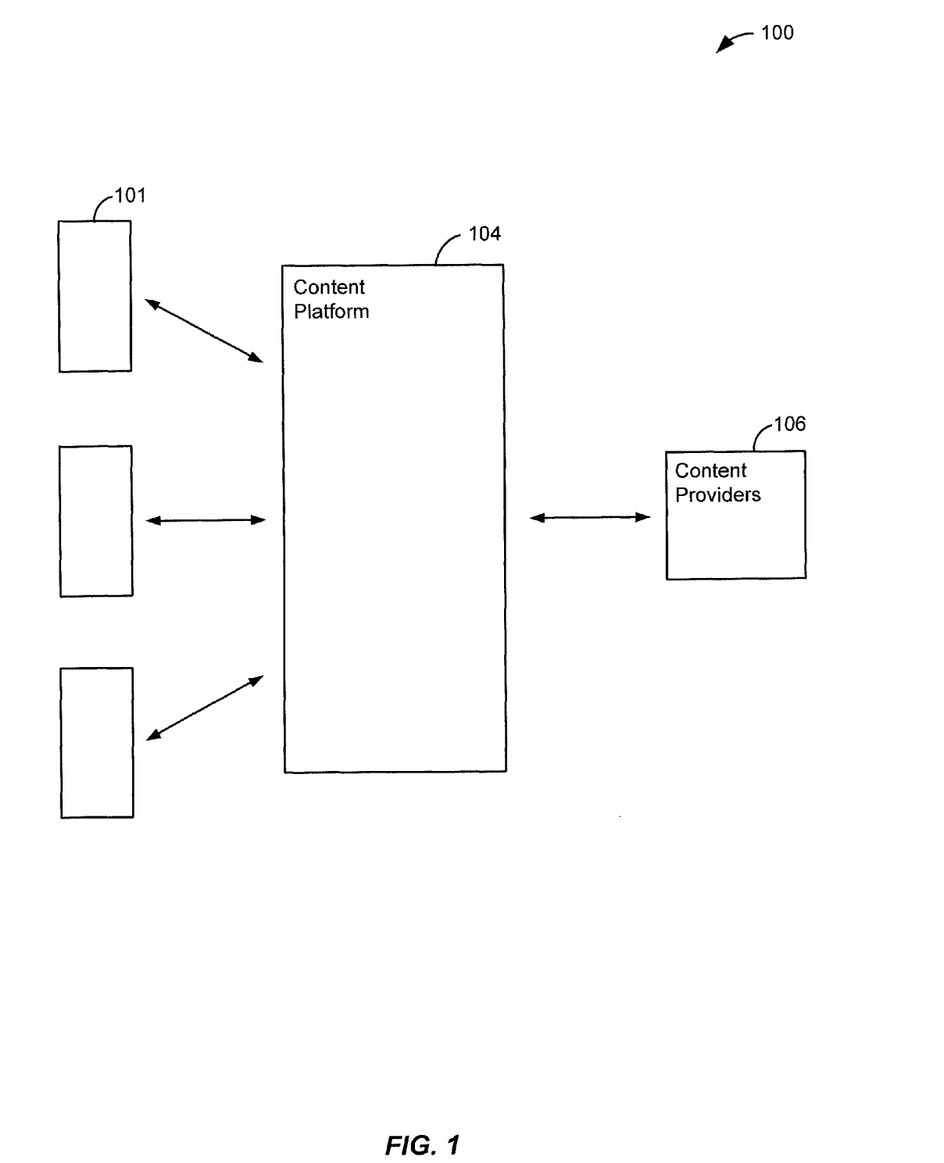
FIG. 1 depicts a system for managing an expense report according to one embodiment of the present invention.

FIG. 1 depicts a system 100 for managing an expense report according to one embodiment of the present invention. In one embodiment, system 100 includes one or more messaging devices 101 and a messaging server 104.

Messaging devices 101 include any devices that can send messages through messaging channels. A messaging channel is a channel in which messages of a certain format or protocol may be sent. For example, the messaging formats may be short message service (SMS), multimedia messaging service (MMS), voice, email, instant message (IM), facsimile, etc. In one example, SMS messages may be sent through an SMS messaging channel. Also, MMS messages may be sent through an MMS messaging channel. Each messaging channel may require a different protocol or format in order to send the messages through the channel.

Messaging devices 101 may include cellular phones, personal digital assistants (PDAs), personal computers, workstations, fax machines, plain old telephone service (POTS) telephones, etc. Messaging devices 101 are configured to send messages through messaging channels. For example, an SMS device sends messages through an SMS channel. Also, a messaging device 101 may be configured to send messages through multiple messaging channels. For example, a cellular phone may be configured to send SMS and MMS messages through SMS and MMS messaging channels.

Content platform 104 is configured to provide content to messaging devices 101. Content may be provided from external sources 106 or from content stored locally to messaging server 104. Examples of content may include any information. For example, content may be multimedia information, videos, data, television programs, audio information, etc.

Further details of platform 104 are described in U.S. patent application Ser. No. 11/138,844, entitled "PLATFORM AND SERVICE FOR MANAGEMENT AND MULTI-CHANNEL DELIVERY OF MULTI-TYPES OF CONTENTS", filed concurrently filed May 25, 2005. Although platform 104 is described, it will be understood that other platforms may be used.

Determining a Delivery Status for Streamed Content

Figure 2:
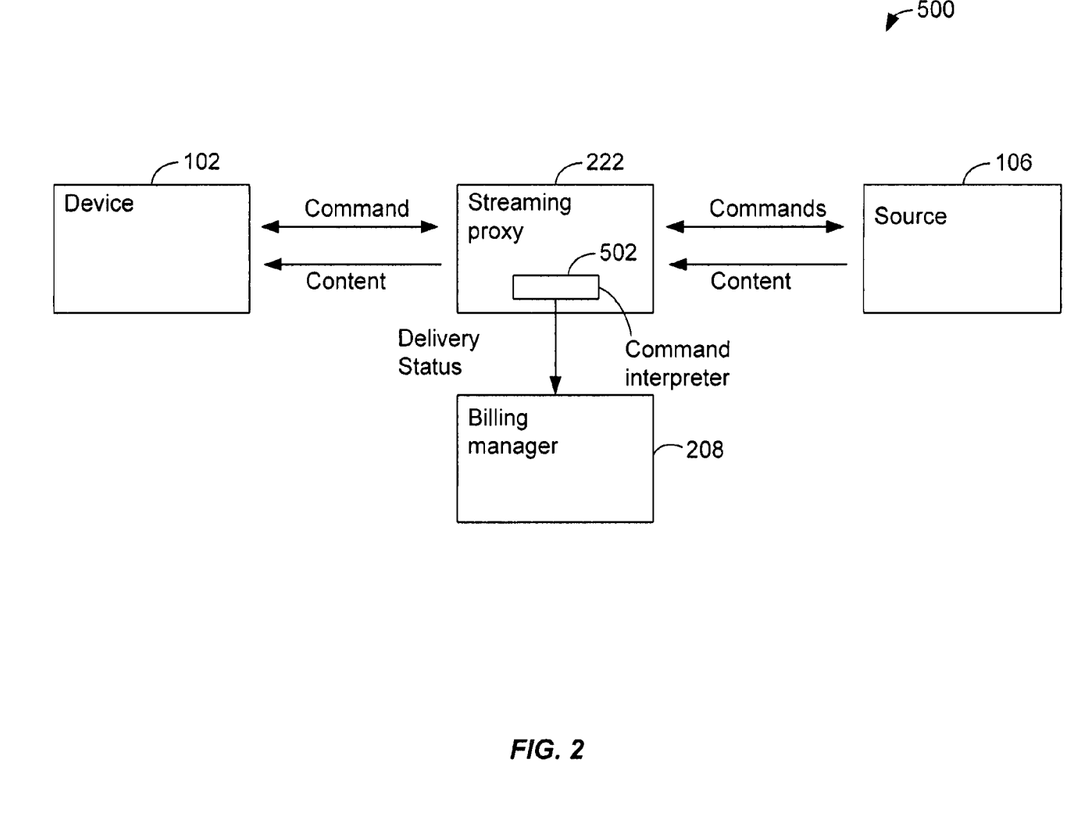
FIG. 2 depicts a system that is used to determine a delivery status for a streaming delivery of content according to one embodiment of the present invention.

FIG. 2 depicts a system 500 that is used to determine a delivery status for a streaming delivery of content according to one embodiment of the present invention. As shown, an access device 102, a streaming proxy 222, and a source 106 are provided. Access device 102 may be any device that can receive streaming content from source 106. For example, access device 102 may be a computer, cellular phone, personal digital assistant (PDA), television, etc. The request for content may be sent by access device 102 using any access channels as described above. In addition, a person skilled in the art will appreciate other methods of requesting the delivery of streaming content. For example, a user may call a service in order to request the streaming delivery of content. Further, the Internet may be used to request the content. In one embodiment, the device used to order the content may be different from the device that receives the content.

The content that may be streamed may be any kind of content. For example, the content may be a short video clip, movie, video, audio, or any other multimedia information.

When a request for a service for streaming delivery of content is received, source 106 is configured to provide the content. The content may be streamed through streaming proxy 222. As described above, the content is streamed from source 106 through streaming proxy 222 to device 102. In other embodiments, the content may be stored by a streaming proxy 222 in a database knot shown). In this case, when a request from device 102 is received, streaming proxy 222 may stream the content from the database to device 102.

Embodiments of the present invention determine if the delivery of content should be considered successful for a billing event. For example, the full delivery of content may be delivered, however, the content may have been delivered at a bit rate that was too slow for the user to effectively watch the video. Also, the streaming delivery of content may have failed during the setup. These are considerations that may need to be taken into account when billing the user.

In one embodiment, a user may be billed for the streaming delivery of content on a prepaid and/or postpaid billing method. The prepaid method is where a user may have an amount of credit for a source 106 and an amount for the service is debited from that amount before the delivery of the content. Also, the user may pay for the content either by prepayment methods, such as the user may input payment information (e.g., credit card information) before the delivery of content. Accordingly, a user is charged for the delivery of content before the delivery happens.

In a postpaid method, the user is billed for the method when a signal is received that the streaming delivery of content is finished. This may occur when the streaming content stops streaming to the user.

During the process of the streaming of content from source 106 to device 102, commands are sent between device 102 and source 106. For example, real time streaming protocol (RTSP) is a protocol that is used in order to stream content. This protocol defines certain commands that may be used in delivering the content. For example, set up commands may be sent between device 102 and source 106 in order to initialize the content delivery. Once the connection is initialized, play/pause commands may be sent from device 102 to source 106. This indicates when a user wants to play and pause the streaming delivery of content. When the delivery is done, tear down commands are sent between the source 106 and device 102 in order to end the session. Other commands may also be sent during the delivery of content. For example, if any errors occur, error messages may be sent.

In addition to the commands that are sent, when the delivery of content is finished, statistics on the delivery may be sent. Command interpreter 502 may intercept the statistics and analyze them in addition to the commands to determine a delivery status. The statistics may indicate the speed of the connection, if any errors occurred, etc. It is a general summary of the delivery of content and may vary between sources 106.

Typically, these messages are sent between source 106 and device 102. However, a command interpreter 502 is configured to intercept commands that are sent between device 102 and source 106. In this way, command interpreter 502 may analyze the sequence of commands and determine if a delivery status for the delivery of content.

Different factors may be taken into account as to whether the delivery status was successful. In one embodiment, the commands that are sent may or may not indicate explicitly that the delivery status should be successful. For example, a video may be played by a device 102 and the last second of the credits may generate an error message. In one embodiment, command interpreter 502 is configured to determine whether this delivery of content should be considered successful or not. The fact that an error occurred the last second may or may not cause command interpreter 502 to determine that the delivery should be determined to be successful or not. For example, command interpreter 502 may determine that even though an error occurred, it occurred in the last second of the video and thus, the user who requested the streaming delivery of content should still be billed.

Command interpreter 502 may include many rules on interpreting the sequence of commands that are intercepted. Depending on the sequence of commands received, command interpreter 502 is configured to determine if the streaming delivery of content was successful or not.

Also, command interpreter 502 may use a history of a user that requested the content. For example, a user may have a pattern of stopping delivery before a teardown command is sent. This may be used to avoid being billed but command interpreter 502 may deem the delivery successful if a teardown command is not sent for the user. Other patterns of access may also be analyzed.

When the delivery status is determined, it is sent to a billing manager 208. Billing manager 208 then can determine how the user should be billed based on the delivery status. For example, if the user was using a prepaid method, then the user's account may be credited with the amount that was debited before the delivery of content. Also, if the delivery was unsuccessful and the billing method is postpaid, then the user would not be charged for the streaming delivery of content. And if the delivery was successful, then the user would be charged for the delivered content if the billing method is postpaid.

Accordingly, command interpreter 502 provides techniques for determining a delivery status for streaming content delivery from source 106 to device 102. In another embodiment, the delivery status is not explicitly sent to platform 104. Accordingly, command interpreter 502 provides techniques for interpreting commands in order to determine if a content delivery was successful or not.

Figure 3:
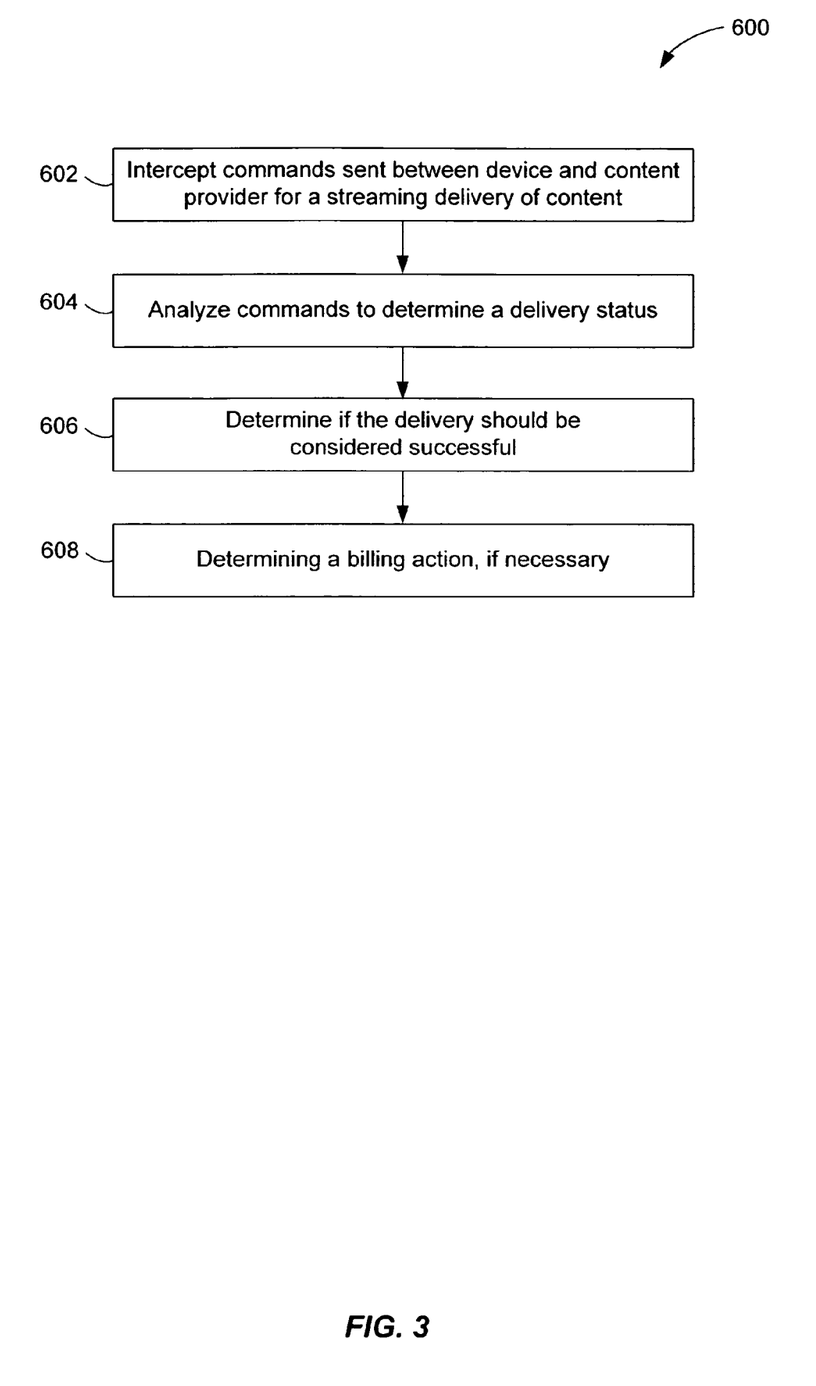
FIG. 3 depicts a simplified flowchart of a method for determining a billing action according to one embodiment of the present invention.

FIG. 3 depicts a simplified flowchart 600 of a method for determining a billing action according to one embodiment of the present invention. In step 602, commands sent between device 102 and source 106 are intercepted for a streaming delivery of content. The commands may be intercepted because the streaming delivery of content is streamed through a proxy 222 of content provider 104. Accordingly, content provider 104 may easily intercept the commands using command interpreter 502. Although the content seems to be streaming to device 102 directly from source 106, the content is being streamed from source 106 to streaming proxy 222, which then streams the content to device 102. Accordingly, commands sent between device 102 and source 106 are also sent through streaming proxy 222. Thus, the commands can also be intercepted in addition to being relayed between device 102 and source 106.

In step 604, the commands are analyzed to determine a delivery status. A rules base may be provided that uses a sequence of commands sent in order to determine what a delivery status should be. The delivery status may be that the delivery is successful or unsuccessful. Additionally, varying degrees of how successful or unsuccessful the delivery status was may also be determined. For example, the successfulness of a delivery may be rated as three quarters if three quarters of a video is shown.

In step 606, it is determined if the delivery should be considered successful. Using the rules base, the delivery status is determined. This may vary for different types of content that is delivered. For example, a video may have to be delivered at a certain bit rate in order to be considered successful. Additionally, an audio file may be delivered without losing a certain number of packets to be considered successful. Additionally, if errors occurred in delivering the content, then, a delivery may be considered unsuccessful.

In step 608, a billing action is determined, if necessary. For example, depending on the billing method that was used, different billing actions may be determined. For example, if the billing method was prepaid, then a user's account may be credited if the delivery was unsuccessful. If the delivery was successful, then no action may be taken. If the billing method was postpaid, and the delivery was successful, the user's account may be billed. If the delivery was unsuccessful, the user's account may not be billed in the postpaid method.

As discussed above, the commands sent may be intercepted and may be RTSP commands. Although RTSP commands are described, it should be understood that other types of commands may be intercepted. For example, any commands that are necessary in order to provide streaming delivery of content may be intercepted. For example, other protocols such as session initiation protocol (SIP), streaming download protocol (SDP), real-time transport protocol (RTP) or other proprietary protocol commands may be intercepted and analyzed.

Figure 4:
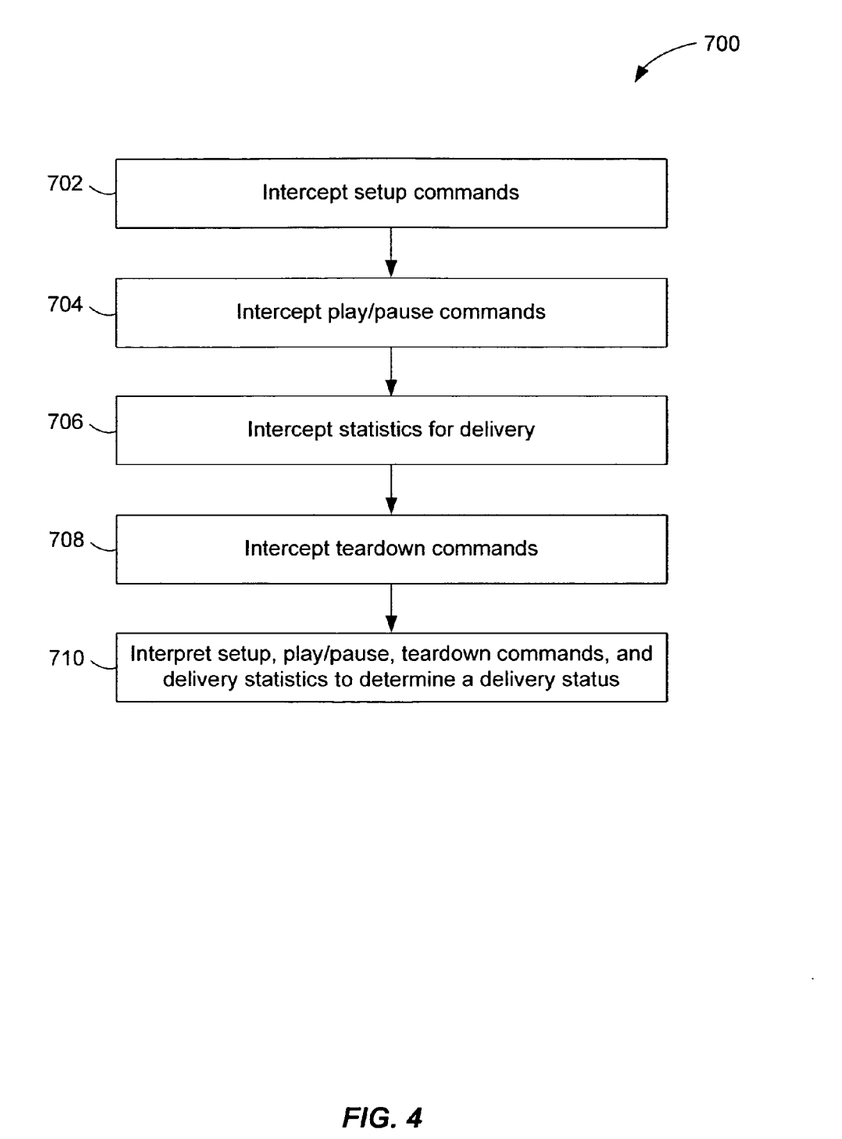
FIG. 4 depicts a simplified flowchart of a method for intercepting and interpreting RTSP commands according to one embodiment of the present invention.

FIG. 4 depicts a simplified flowchart 700 of a method for intercepting and interpreting RTSP commands according to one embodiment of the present invention. In step 702, a set of commands sent using RTSP are intercepted. For example, a uniform resource locator (URI) is entered in a device 102. For example, the URI may be typed into a web browser. Device 102 then parses the RTSP URI in order to determine a streaming server name and port. If the server name is not in an IP format, device 102 performs a DNS lookup to get the streaming server's IP address from the DNS name. Device 102 then initiates a transfer control protocol (TCP) connection to source 106.

When a connection to source 106 has been successfully established, device 102 sends source 106 an options request. The server returns option information back to device 102. This information can include the version of RTSP, the date, the session number, a server name, and the RTSP method supported by this session, and so on.

Device 102 then sends source 106 a DESCRIBE REQUEST to retrieve a description of the content. The request includes an accept header that specifies the session description protocol (SDP) format. Source 106 responds with initialization information required for the delivery of content. The SDP header information for the presentation is also included in the returned information.

Device 102 then sends source 106 a SET UP request for each stream required to play back the content. The set up request specifies the acceptable transfer protocols for streaming the content. If the content includes an audio and video stream, then one SET UP request is sent for the audio stream and a second SET UP request is sent for the video stream. Source 106 then responds with acceptable network transports (transfer control protocol (TCP), uniform datagram protocol (UDP), multicast) and protocols (RTSP, RTP) for the individual streams of content.

Device 102 then initializes the appropriate rendering plug-in required to play back the streaming delivery of content. Device 102 then sends source 106 a SET PARAMETER request that includes delivery bandwidth for the stream.

Delivery bandwidth either can be a fixed bit rate or can be a current bandwidth specified by the client's bandwidth preference. Any of the above commands may be intercepted as setup commands.

In step 704, PLAY/PAUSE commands are intercepted. After the SET PARAMETER request is sent, device 102 may send a PLAY request that warns source 106 that it should begin sending streaming content to device 102. During the streaming session, device 102 periodically pings source 106 with the SET PARAMETER request. Although source 106 responds to this request with an error message, the message is ignored and device 102 is kept aware that source 106 is responding. During the playing, a user may also send a PAUSE command to source 106. The pause command is a command that tells source 106 to pause the streaming content.

In step 706, statistics for the delivery may be intercepted, if available. For example, device 102 sends a SET PARAMETER request that contains player statistics for the streaming content. The statistics may indicate a quality of service, such as the bit rate that the video was sent at, the resolution, etc.

In step 708, a tear down request is sent to close the connection with source 106. The tear down request is a request that ends the session.

In step 710, the setup, play/pause, delivery statistics, and tear down commands are interpreted to terminate delivery status. For example, a command interpreter 502 may determine that the commands sent between device 102 and source 106 proceeded in a correct way. For example, they evolved from set up to play/pause, to tear down. If no error messages are intercepted during that sequence, the delivery may be considered successful.

However, if the session fails at a setup or play stage, then command interpreter 502 may indicate that the delivery was not successful. For example, a play command may never be intercepted by command interpreter 502. Thus, it may indicate that the streaming delivery of content was not started. Also, an error message may be received during the setup and the play/pause, and tear down commands are not intercepted. In this case, the delivery status may be considered unsuccessful.

Accordingly, embodiments of the present invention determine a delivery status based on intercepted commands required to provide a service. These commands may be interpreted and then is determined if the delivery status is successful or not. The delivery status is determined from a billing standpoint and thus, the rules are used to determine if a billing action should be taken.

Embodiments of the present invention provide many advantages. For example, from a billing standpoint, it may not be clear whether the delivery of content should be considered successful or not. Content delivery services often do not explicitly state that a delivery of content was successful or not from a billing standpoint. For example, error messages may be received during the delivery but that may not mean the delivery of content should be billed. Also, there may be other factors that may not be flagged by a content provider but may cause the delivery to be considered unsuccessful. For example, a slow bit rate may be considered an unsuccessful delivery.

By intercepting commands sent between a device and content provider, a better understanding of whether the content delivery was successful or not can be determined. This allows for better customer service. Unsuccessful deliveries may not be charged or charges may be reversed. Thus, a user does not need to affirmatively contact the content delivery service to have the billing charges reversed.

Figure 5:
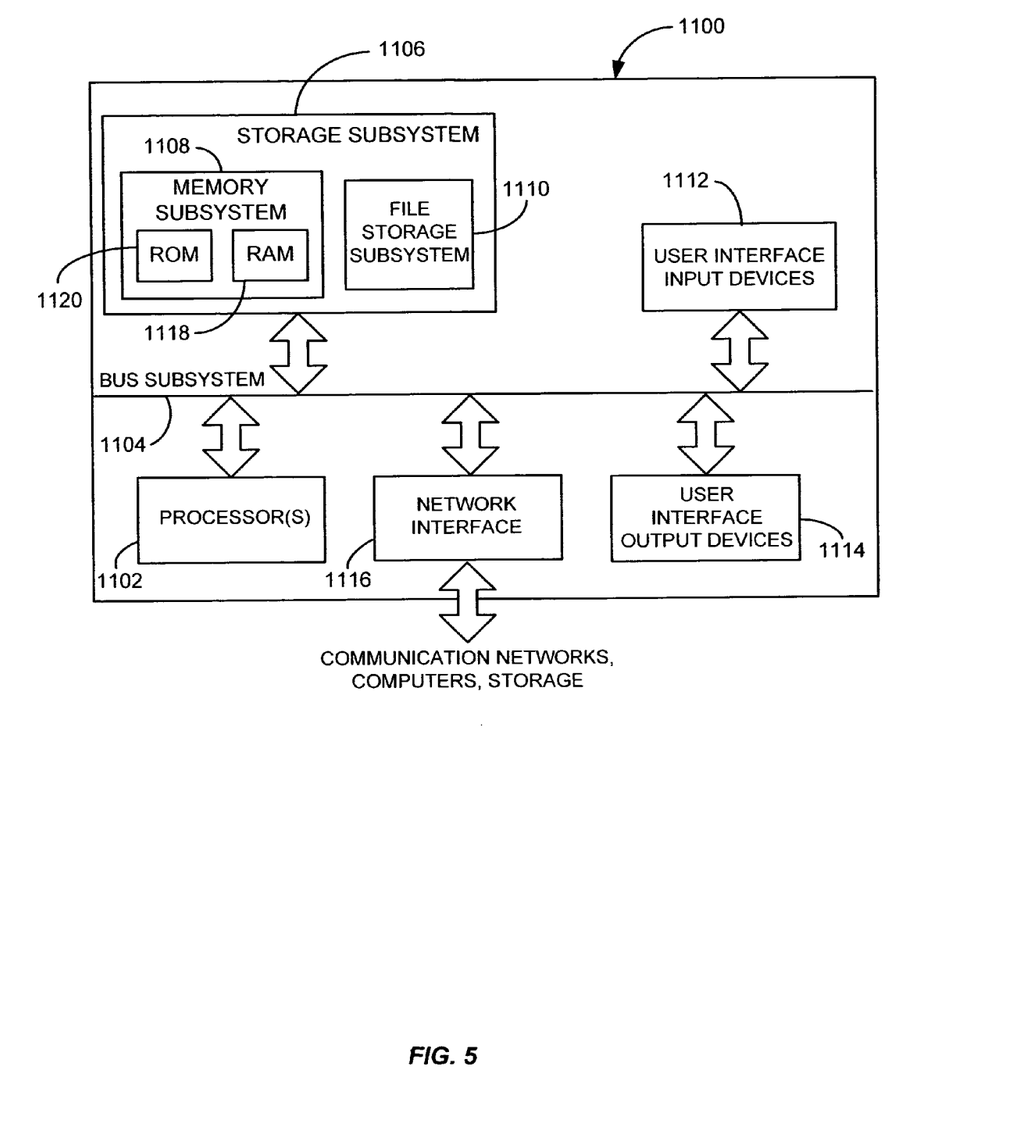
FIG. 5 is a simplified block diagram of data processing system that may be used to perform processing according to an embodiment of the present invention.

FIG. 5 is a simplified block diagram of data processing system 1100 that may be used to perform processing according to an embodiment of the present invention. As shown in FIG. 5, data processing system 1100 includes at least one processor 1102, which communicates with a number of peripheral devices via a bus subsystem 1104. These peripheral devices may include a storage subsystem 1106, comprising a memory subsystem 1108 and a file storage subsystem 1110, user interface input devices 1112, user interface output devices 1114, and a network interface subsystem 1116. The input and output devices allow user interaction with data processing system 1102.

Network interface subsystem 1116 provides an interface to other computer systems, networks, and storage resources. The networks may include the Internet, a local area network (LAN), a wide area network (WAN), a wireless network, an intranet, a private network, a public network, a switched network, or any other suitable communication network. Network interface subsystem 1116 serves as an interface for receiving data from other sources and for transmitting data to other sources from data processing system 1100. Embodiments of network interface subsystem 1116 include an Ethernet card, a modem (telephone, satellite, cable, ISDN, etc.), (asynchronous) digital subscriber line (DSL) units, and the like.

User interface input devices 1112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 1100.

User interface output devices 1114 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 1100.

Storage subsystem 1106 may be configured to store the basic programming and data constructs that provide the functionality of the present invention. For example, according to an embodiment of the present invention, software modules implementing the functionality of the present invention may be stored in storage subsystem 1106. These software modules may be executed by processor(s) 1102. Storage subsystem 1106 may also provide a repository for storing data used in accordance with the present invention. Storage subsystem 1106 may comprise memory subsystem 1108 and file/disk storage subsystem 1110.

Memory subsystem 1108 may include a number of memories including a main random access memory (RAM) 1118 for storage of instructions and data during program execution and a read only memory (ROM) 1120 in which fixed instructions are stored. File storage subsystem 1110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 1104 provides a mechanism for letting the various components and subsystems of data processing system 1102 communicate with each other as intended. Although bus subsystem 1104 is shown schematically as a single bus, alternative embodiments of the bus subsystem may utilize multiple busses.

Data processing system 1100 can be of varying types including a personal computer, a portable computer, a workstation, a network computer, a mainframe, a kiosk, or any other data processing system. Due to the ever-changing nature of computers and networks, the description of data processing system 1100 depicted in FIG. 5 is intended only as a specific example for purposes of illustrating the preferred embodiment of the computer system. Many other configurations having more or fewer components than the system depicted in FIG. 5 are possible.

The present invention can be implemented in the form of control logic in software or hardware or a combination of both. The control logic may be stored in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for determining a status of a streaming delivery of content, the method comprising:
   intercepting at a streaming proxy system instructions sent between a client system and a content provider system during a streaming delivery of content to the client system from the content provider system through the streaming proxy system, the instructions being defined according to a streaming protocol and comprising a plurality of commands used by the client system and the content provider system to manage the streaming delivery of content including at least one set up instruction, at least one tear down instruction, and at least one play or pause instruction issued by the client based on playback control of the content by a user of the client system;
   analyzing with the streaming proxy system the commands used by the client system and content provider system to manage the streaming delivery of content to determine a delivery status for the streaming delivery of content to the client system based on a sequence and timing of the plurality of commands, the delivery status being determined at least in part by applying a rules base to the intercepted commands and a history of actions by a user of the client during previous streaming of content and indicating a pattern of access of content by the user of the client with the streaming proxy system, the delivery status representing at least a completeness of delivery; and
   based upon the determined delivery status, determining with the streaming proxy system at least one billing action for the streaming delivery.

2. The method of claim 1, wherein the delivery status is used by the streaming proxy system to determine a billing action corresponding to an amount to be billed for the streaming delivery of content.

3. The method of claim 2, wherein if billing for the streaming delivery of content is prepaid and the delivery status is determined to be an unsuccessful delivery, the determined billing action corresponds to crediting a user's account that was charged for the prepaid billing.

4. The method of claim 2, wherein if billing for streaming delivery of content is postpaid and the delivery status is determined to be a successful delivery, the determined billing action corresponds to billing a user's account for the delivery of content.

5. The method of claim 2, wherein if billing for streaming delivery of content is postpaid and the delivery status is determined to be an unsuccessful delivery, the determined billing action corresponds to not billing a user's account for the delivery of content.

6. The method of claim 1, wherein the instructions comprise real time streaming protocol (RTSP) instructions.

7. The method of claim 1, wherein the instructions comprise at least one play instruction and at least one pause instruction.

8. The method of claim 1, wherein the streaming delivery is considered unsuccessful if a tear down instruction is not sent.

9. The method of claim 1, wherein the streaming delivery is considered successful if the streaming delivery is played, paused, or resumed through a predetermined portion of the content.

10. The method of claim 7, further comprising:
    determining with the streaming proxy system a history of actions for the user of the client system, wherein the history is used by the streaming proxy system to determine if the streaming delivery is successful.

11. The method of claim 1, further comprising:
    retrieving with the streaming proxy system statistics provided for the streaming delivery of content by at least one of the client system and the content provider system; and
    using the statistics to determine the delivery status with the streaming proxy system.

12. The method of claim 11, wherein the statistics comprise a quality of service.

13. The method of claim 1, wherein analyzing comprises:
    determining whether an instruction is not sent; and
    determining a failed delivery status if the instruction is not sent.

14. The method of claim 13, wherein the instruction comprises a start, a play, or a tear down instruction.

15. The method of claim 1, further comprising:
    determining with the streaming proxy system if the instructions comprise at least one play, pause or resume instruction allowing streaming of at least a portion of the content; and
    determining with the streaming proxy system a successful delivery status if the at least a portion of the content is streamed.

16. The method of claim 15, further comprising:
    determining with the streaming proxy system the history of the user of the client system; and
    using the history to determine the delivery status with the streaming proxy system.

17. A method for determining a billing action for a streaming delivery of content, the method comprising:
    intercepting with a streaming proxy system set up instructions sent between a client and a source of content, the set up instructions being defined according to a streaming protocol and used to initiate the streaming delivery of content;
    intercepting with the streaming proxy system at least one play or pause commands sent from the client to the source based on playback control of the content by a user of the client during the providing of the content;

intercepting with the streaming proxy system tear down instructions sent between the client and the source at the end of the providing of the content;

analyzing with the streaming proxy system the intercepted set up, play or pause, and tear down instructions to determine a delivery status for the streaming delivery of content to the client based on a sequence and timing of the instructions, the delivery status being determined at least in part by applying a rules base with the streaming proxy system to the intercepted instructions and a history of actions by a user of the client during previous streaming of content and indicating a pattern of access of content by the user of the client; and based upon the determined delivery status, determining with the streaming proxy system at least one billing action for the streaming delivery.

18. The method of claim 17, wherein the set up, play or pause, and tear down instructions are RTSP instructions.

19. The method of claim 17, wherein the billing action corresponds to determining an amount to be billed for the streaming delivery of content.

20. The method of claim 19, wherein if billing for delivery of content is prepaid and the delivery status is determined to be an unsuccessful delivery, the determined billing action corresponds to crediting a user's account that was charged for the prepaid billing.

21. The method of claim 19, wherein if billing for delivery of content is postpaid and the delivery status is determined to be a successful delivery, the determined billing action corresponds to billing a user's account for the delivery of content.

22. The method of claim 19, wherein if billing for delivery of content is postpaid and the delivery status is determined to be an unsuccessful delivery, the determined billing action corresponds to not billing a user's account for the delivery of content.

23. The method of claim 17, further comprising:
retrieving with the streaming proxy system statistics provided for the streaming delivery of content; and
using the statistics to determine the delivery status with the streaming proxy system.

24. The method of claim 23, wherein the statistics comprise a quality of service.

25. The method of claim 17, further comprising:
determining with the streaming proxy system if the instructions comprise at least one of play, pause or resume instructions that allow streaming of at least a portion of the content; and
determining with the streaming proxy system a successful delivery status if the at least a portion of the content is streamed.

26. The method of claim 25, further comprising:
determining with the streaming proxy system a history of a user of the client; and
using the history by the streaming proxy system to determine the delivery status.

27. A platform configured to determine a status of a streaming delivery of content, the platform comprising:

at least one processor; and
memory including instructions that, when executed by the at least one processor, cause the at least one processor to:
maintain a history of actions by a user of a client during streaming of content and indicating a pattern of access of content by the user of the client intercept set up instructions sent between the client and a source for the content, the set up instructions being defined according to a streaming protocol and used to initiate the streaming delivery of content;

intercept at least one play or pause commands sent from the client to the source based on playback control of the content by a user of the client during the providing of the content;

intercept tear down instructions sent between the client and the source at the end of the providing of the content;

analyze a sequence and timing of the intercepted set up, play or pause, and tear down commands and instructions and the history of actions by the user of the client to determine a delivery status for the streaming delivery of content to the client, the delivery status being determined at least in part by applying a rules base to the intercepted commands and instructions; and based upon the determined delivery status, determine at least one billing action for the streaming delivery.

28. A platform configured to determine a status of a streaming delivery of content, the platform comprising:
at least one processor; and
memory including instructions that, when executed by the at least one processor, cause the at least one processor to:
intercept instructions sent between a client and a content provider during a streaming delivery of content to the client from the content provider through the streaming proxy system, the instructions being defined according to a streaming protocol and comprising a plurality of commands used by at least one of the client and the content provider to manage the streaming delivery of content, the instructions including at least two of a setup instruction, a play instruction issued by the client based on playback control of the content by a user of the client, a pause instruction issued by the client based on playback control of the content by the user of the client, and a teardown instruction;

analyze the commands used by the client and content provider to manage the streaming delivery of content to determine a delivery status for the streaming delivery of content to the client system based on a sequence and timing of the plurality of commands, the delivery status being determined at least in part by applying a rules base to the intercepted commands and a history of actions by a user of the client during previous streaming of content and indicating a pattern of access of content by the user of the client, the delivery status representing at least a completeness of delivery; and based upon the determined delivery status, determine at least one billing action for the streaming delivery.

* * * * *

UNITED STATES PATENT AND TRADEMARK OFFICE
CERTIFICATE OF CORRECTION

| | | |
|---|---|---|
| PATENT NO. | : 7,917,612 B2 | Page 1 of 1 |
| APPLICATION NO. | : 11/138546 | |
| DATED | : March 29, 2011 | |
| INVENTOR(S) | : Maes | |

It is certified that error appears in the above-identified patent and that said Letters Patent is hereby corrected as shown below:

In column 3, line 48, before "filed" delete "filed concurrently".

In column 4, line 10, delete "knot shown)." and insert -- (not shown). --, therefor.

In column 12, line 6, in Claim 27, after "client" insert -- ; --.

Signed and Sealed this
Fourth Day of October, 2011

David J. Kappos
*Director of the United States Patent and Trademark Office*